(12) United States Patent
Choi et al.

(10) Patent No.: US 12,077,669 B2
(45) Date of Patent: Sep. 3, 2024

(54) OPTICAL MEMBER AND OPTICAL DISPLAY DEVICE COMPRISING SAME

(71) Applicant: SAMSUNG SDI CO., LTD., Yongin-si (KR)

(72) Inventors: Sung Hak Choi, Suwon-si (KR); Jae Sun Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 95 days.

(21) Appl. No.: 17/914,719

(22) PCT Filed: Mar. 26, 2021

(86) PCT No.: PCT/KR2021/003782
§ 371 (c)(1),
(2) Date: Sep. 26, 2022

(87) PCT Pub. No.: WO2021/194305
PCT Pub. Date: Sep. 30, 2021

(65) Prior Publication Data
US 2023/0348725 A1 Nov. 2, 2023

(30) Foreign Application Priority Data

Mar. 26, 2020 (KR) .................. 10-2020-0037164
Mar. 26, 2021 (KR) .................. 10-2021-0039564

(51) Int. Cl.
| | | |
|---|---|---|
| C08K 5/55 | (2006.01) | |
| C08K 5/3417 | (2006.01) | |
| C08K 5/3472 | (2006.01) | |
| C08K 5/353 | (2006.01) | |
| C09B 67/20 | (2006.01) | |
| C09B 67/22 | (2006.01) | |
| G02B 5/00 | (2006.01) | |

(52) U.S. Cl.
CPC ........ C09B 67/0063 (2013.01); C08K 5/3417 (2013.01); C08K 5/3472 (2013.01); C08K 5/353 (2013.01); C08K 5/55 (2013.01); C09B 67/0033 (2013.01); G02B 5/003 (2013.01); C08K 2201/014 (2013.01)

(58) Field of Classification Search
CPC . B32B 27/36; G11B 5/73931; G11B 5/73935; G11B 5/733; Y10S 428/90; Y10S 428/91; Y10T 428/24355; Y10T 428/2495; Y10T 428/25; Y10T 428/26; Y10T 428/266; Y10T 428/2982; Y10T 428/31786; C08J 5/18; C09B 67/0033; C09B 67/0063; G02B 1/11; G02B 5/003; G02B 5/22; G02B 5/223; C08K 2201/014; C08K 5/3417; C08K 5/3472; C08K 5/353; C08K 5/55

See application file for complete search history.

(56) References Cited

U.S. PATENT DOCUMENTS

| | | |
|---|---|---|
| 10,018,871 B1 | 7/2018 | Song et al. |
| 2004/0204555 A1 | 10/2004 | Noda et al. |
| 2015/0323824 A1 | 11/2015 | Hisakado et al. |

FOREIGN PATENT DOCUMENTS

| | | |
|---|---|---|
| CN | 1618867 A | 5/2005 |
| CN | 105518091 A | 4/2016 |
| CN | 107406547 A | 11/2017 |
| CN | 108931864 A | 12/2018 |
| JP | 2009-013200 A | 1/2009 |
| JP | 2014-199424 A | 10/2014 |
| JP | 2015-010192 A | 1/2015 |
| KR | 10-2004-0087955 A | 10/2004 |
| KR | 10-2012-0078435 A | 7/2012 |
| KR | 10-2018-0129024 A | 12/2018 |

OTHER PUBLICATIONS

International Search report for corresponding Application No. PCT/KR2021/003782 dated Jul. 8, 2021, 4 pp.
Chinese Office Action dated Dec. 25, 2023 issued in corresponding Chinese Patent Application No. 202180024422.0 (7 pages).

*Primary Examiner* — Lawrence D Ferguson
(74) *Attorney, Agent, or Firm* — Lewis Roca Rothgerber Christie LLP

(57) ABSTRACT

Provided are an optical member and an optical display device including same, the optical member comprising: a base film; and a light transmission control layer stacked on the lower surface of the base film, wherein the light transmission control layer comprises: a dye or dye mixture including at least one of a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm; and a resin having a hydroxyl value of 5 mgKOH/g or less.

18 Claims, No Drawings

OPTICAL MEMBER AND OPTICAL DISPLAY DEVICE COMPRISING SAME

CROSS-REFERENCE TO RELATED APPLICATIONS

This application is a U.S. National Phase Patent Application of International Application Number PCT/KR2021/003782, filed on Mar. 26, 2021, which claims priority to Korean Patent Application Number 10-2020-0037164, filed on Mar. 26, 2020, and Korean Patent Application Number 10-2021-0039564, filed on Mar. 26, 2021, the entire contents of all of which are incorporated herein by reference.

TECHNICAL FIELD

The present invention relates to an optical member and an optical display device including the same.

BACKGROUND ART

A liquid crystal display is operated by emitting light from a backlight unit through a liquid crystal panel. However, since it is not easy for the liquid crystal display to realize real black due to characteristics of liquid crystals, the liquid crystal display has a limitation in improvement in contrast ratio. Accordingly, development of novel displays capable of reproducing natural colors is progressed in the art. As a result, some display products commercially available in the art realize real black by enhancing brightness and color reproduction through application of quantum dots to a backlight unit or through application of a self-luminous OLED while improving various properties.

As developed in recent years, a new display employs a blue light source and quantum dot particles instead of the backlight unit and liquid crystals of the liquid crystal panel in order to improve color reproduction while realizing real black. However, such a display suffers from deterioration in contrast ratio due to external light in a bright room and requires improvement in reflectivity.

For the display employing the blue light source and the quantum dot particles, blue light emitted from the blue light source excites the quantum dots particles to generate light in the red and green wavelength bands. Here, a layer containing the quantum dot particles may also be provided with light scattering particles, such as $TiO_2$ and the like, which scatter blue light emitted from the backlight unit, thereby further improving luminous efficacy while generating clearer red and green light.

However, when the panel is in a black state, that is, in a power-off state, external light entering the display is scattered and reflected by the light scattering particles, such as $TiO_2$ and the like, thereby causing deterioration in black visibility. In order to improve black visibility by scattering through improvement in reflectivity with respect to external light, selective wavelength absorption dyes or carbon black may be used. Although carbon black provides good light resistance reliability and can improve reflectivity by shielding light in the overall visible spectrum, there is a problem of deterioration in overall transmittance.

The background technique of the present invention is disclosed in Japanese Patent Laid-open Publication No. 2015-010192 and the like.

DISCLOSURE

Technical Problem

It is one aspect of the present invention to provide an optical member that can reduce variation in reflectivity after evaluation of light resistance reliability.

It is another aspect of the present invention to provide an optical member that can reduce variation in light transmittance after evaluation of light resistance reliability.

It is a further aspect of the present invention to provide an optical member that improves black visibility on a screen of an optical display device when stacked on an adherend including light scattering particles.

It is yet another aspect of the present invention to provide an optical member that improves visual sensitivity of reflection through significant reduction in reflectivity and has high total light transmittance.

Technical Solution

One aspect of the present invention relates to an optical member.

1. The optical member includes: a base film and a light transmission control layer stacked on a lower surface of the base film, wherein the light transmission control layer contains dyes or a dye mixture including at least one selected from among a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm; and a resin having a hydroxyl value (OH value) of 5 mgKOH/g or less.

2. In 1, a laminate including the base film and stacked on an upper surface of the light transmission control layer may have a reflectivity of about 5% or less.

3. In 1 and 2, the laminate may include the base film and at least one selected from among a low refractivity layer, a high refractivity layer and a hard coating layer stacked on an upper surface of the base film.

4. In 1 to 3, the resin having a hydroxyl value of 5 mgKOH/g or less may include a resin free from a functional group reactive with respect to heat and/or light.

5. In 4, the resin having a hydroxyl value of 5 mgKOH/g or less may include a resin free from at least one selected from among an epoxy group, a hydroxyl group, and a carboxylic acid group.

6. In 1 to 5, the resin having a hydroxyl value of 5 mgKOH/g or less may include a polymer of a monomer mixture including at least one selected from among an unsubstituted $C_1$ to $C_{10}$ alkyl group-containing (meth)acrylic ester, a cyano (—C≡N) group-containing (meth)acrylic or vinyl monomer, an unsubstituted $C_5$ to $C_{10}$ cycloalkyl group-containing (meth)acrylic ester, an unsubstituted aromatic vinyl monomer, and an unsubstituted $C_1$ to $C_{10}$ alkyl group-containing aromatic vinyl monomer.

7. In 1 to 6, the resin having a hydroxyl value value of 5 mgKOH/g or less may include at least one selected from among a poly(meth)acrylic based resin, a polystyrene based resin, a styrene-acrylonitrile based resin, a methyl (meth)acrylate-styrene-(meth)acrylonitrile based resin, and a polyarylene based resin.

8. In 1 to 7, the resin having a hydroxyl value of 5 mgKOH/g or less may include at least one selected from among a polycarbonate based resin, a polyurethane based resin, and a polyvinylidene fluoride based resin.

9. In 1 to 8, the light transmission control layer may contain the first dye.

10. In 9, the first dye may include a porphyrin based dye.

11. In 9 and 10, the first dye may be present in an amount of about 0.0001 parts by weight to about 10 parts by weight relative to 100 parts by weight of the resin having a hydroxyl value of 5 mgKOH/g or less.

12. In 9 to 12, the light transmission control layer may further include at least one selected from among the second dye, the third dye, and the fourth dye.

13. In 12, the second dye may be a merocyanine based dye, the third dye may be a boron dipyrromethene based dye, and the fourth dye may be a phthalocyanine based dye.

14. In 12 and 13, the light transmission control layer may further include about 0 parts by weight to about 10 parts by weight of the second dye, about 0 parts by weight to about 10 parts by weight of the third dye, and about 0 parts by weight to about 10 parts by weight of the fourth dye, relative to 100 parts by weight of the resin having a hydroxyl value of 5 mgKOH/g or less.

15. In 1 to 14, the light transmission control layer may further include a light stabilizer.

16. In 1 to 14, the optical member may have a light transmittance variation of 5% or less, as calculated by Equation 1, and a reflectivity variation of 1% or less, as calculated by Equation 2.

Light transmittance variation=(total sum of absolute values of light transmittance variations)/(number of dyes contained in light transmission control layer),  [Equation 1]

where the total sum of absolute values of light transmittance variations refers to the total sum of values represented by Equation 1-1 at the maximum absorption wavelengths of the dyes contained in the light transmission control layer:

$|T1-T0|$  [Equation 1-1]

where T0 is initial light transmittance (unit: %) of the optical member at the maximum absorption wavelength of a dye, and T1 is light transmittance (unit: %) of the optical member at the maximum absorption wavelength of the corresponding dye light resistance reliability testing.

Reflectivity variation=$|R1-R0|$,  [Equation 2]

where R0 is initial reflectivity (unit: %) of the optical member, and

R1 is reflectivity (unit: %) of the optical member light resistance reliability testing.

Another aspect of the present invention relates to an optical display device.

17. The optical display device includes the optical member according to the present invention.

18. In 17, the optical display device may further include a quantum dot layer and a light scattering particle-containing layer or a panel containing quantum dots and light scattering particles on a lower surface of the optical member.

Advantageous Effects

The present invention provides an optical member that can reduce variation in reflectivity after evaluation of light resistance reliability.

The present invention provides an optical member that can reduce variation in light transmittance after evaluation of light resistance reliability.

The present invention provides an optical member that improves black visibility on a screen of an optical display device when stacked on an adherend including light scattering particles.

The present invention provides an optical member that improves visual sensitivity of reflection through significant reduction in reflectivity and has high total light transmittance.

BEST MODE

Hereinafter, embodiments of the present invention will be described in detail with reference to the accompanying drawings such that the present invention can be easily implemented by those skilled in the art. It should be understood that the present invention may be embodied in various ways and is not limited to the following embodiments.

Herein, "(meth)acryl" refers to acryl and/or methacryl.

As used herein to represent a specific numerical range, the expression "X to Y" means "greater than or equal to X and less than or equal to Y (X≤ and ≤Y)".

Herein, "hydroxyl value (OH value)" of a resin is a value measured with respect to the resin by an acetic anhydride-pyridine method according to JISK 8004-1961.

Measurement devices: Erlenmeyer flask (200 mL), air cooling tube (30 cm), pipette (5 mL, 10 mL), burette (50 mL), and oil bath.

Measurement method: 20 mL of a mixture of a resin (about 1 g) and 5 mL of a mixture of acetic anhydride-pyridine (prepared by adding pyridine to 20 mL of acetic anhydride to prepare 400 mL of acetic anhydride-pyridine) was placed in the Erlenmeyer flask and shaken five times or more, followed by attaching a cooler to the flask, which in turn was placed in the oil bath for reaction for 1 hour and 30 min. 1 mL of distilled water was added to the flask, which in turn was shaken 5 times or more and left in the oil bath for promotion of hydrolysis for 10 min. Then, the flask was removed from the oil bath and left at room temperature for 10 min. Next, an inner wall of the cooler was washed with 10 mL of acetone and the flask was shaken 5 times or more. Then, about 3 to 4 drops of phenolphthalein indicator were added to the flask, followed by titration with 0.5N (mol/L) KOH standard solution (potassium hydroxide ethanol solution). The hydroxyl value of the resin was calculated by the following equation:

hydroxyl value (mgKOH/g)=$\{[(B-C) \times f \times 28.05]/S\}+D$,  [Equation]

where B is the amount of 0.5 mol/L potassium hydroxide ethanol solution (mL) used for a blank test (not including a specimen);

C is the amount of 0.5 mol/L potassium hydroxide ethanol solution (mL) used for titration;

f is a concentration factor of 0.5 mol/L potassium hydroxide ethanol solution;

S is the mass of a resin specimen (g); and

D is an acid value.

Herein, "maximum absorption wavelength (λmax)" of a dye means the wavelength at which the dye exhibits the maximum absorbency in measurement of absorbency with respect to 10 ppm of a dye solution in methyl ethyl ketone. The maximum absorbency may be measured by a method well-known to those skilled in the art.

Herein, "reflectivity" of a laminate including a base film means an average of reflectivity values of a specimen, as measured in a reflection mode in the wavelength range of 380 nm to 780 nm using a reflectometer, in which the specimen is prepared by laminating a CL-885 black acryl sheet of Nitto resin including an adhesive having an index of refraction of 1.46 to 1.50 on the base film of the laminate at 70° C. The reflectometer may be a UV/VIS spectrometer Lambda 1050 (Perkin Elmer Co., Ltd.), but is not limited thereto.

Herein, "reflectivity" of an optical member means an SCE (Specular Component Excluded) value measured in the SCE mode method.

Herein, in "light resistance reliability" evaluation of the optical member, light transmittance variation or reflectivity variation of the optical member is evaluated before and after irradiation in a Xenon Test Chamber (Q-SUN) under conditions of light source lamp: Xenon lamp, irradiation wavelength: 340 nm, irradiation intensity: 0.35 W/cm$^2$, irradiation temperature: 63° C., irradiation time: 500 hours, irradiation direction: at a side of the laminate including the base film.

Herein, "light transmittance variation of Equation 1" of the optical member means an average of light transmittance variations calculated according to (total sum of absolute values of light transmittance variations)/(number of dyes contained in light transmission control layer), after measuring the absolute values of the light transmittance variations at the maximum absorption wavelength of each dye in the light transmission control layer of the optical member before and after irradiation of the optical member for evaluation of light resistance reliability.

Herein, "reflectivity variation of Equation 1" of the optical member means an absolute value of a variation in reflectivity of the optical member, as measured by the above method before and after irradiation of the optical member for evaluation of light resistance reliability.

The inventors of the present invention developed an optical member to be attached to an adherend including quantum dots and light scattering particles (e.g.: TiO$_2$). The optical member improves black visibility of a screen through absorption of a fraction of external light scattered by the light scattering particles in a turn-off state, and improves luminous efficacy and brightness of internal light of an optical display device while significantly reducing reflectivity and improving visual sensitivity of reflection through improvement in light transmittance in a turn-on state, thereby improving light resistance reliability in both light transmittance and reflectivity.

Next, an optical member according to one embodiment of the invention will be described.

The optical member includes a base film and a light transmission control layer stacked on a lower surface of the base film, wherein the light transmission control layer contains dyes or a dye mixture including at least one selected from among a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm; and a resin having a hydroxyl value of 5 mgKOH/g or less.

The optical member has low reflectivity. The optical member may have a reflectivity of about 0.5% or less, for example, greater than about 0% to about 0.1%. Within this range, when stacked on an adherend containing light scattering particles (e.g.: TiO$_2$), the optical member can improve visual sensitivity of reflection while providing good appearance. Most preferably, the optical member has a reflectivity of greater than about 0% to about 0.12%.

The optical member has lower reflectivity than the laminate including the base film. This can be realized by the light transmission control layer according to the present invention, as described below. In general, the laminate can reduce reflectivity of an adherend when stacked on the adherend. According to the present invention, the optical member further includes a dye-containing light transmission control layer to have much lower reflectivity than the laminate including the base film alone. The light transmission control layer can further reduce reflectivity of the optical member. This will be described below in detail.

In one embodiment, a difference in reflectivity between the laminate including the base film and the optical member may be about 2.0% or less, specifically in the rage of greater than about 0% to about 2.0%, more specifically in the rage of greater than about 0% to about 1.0%. Within this range, the optical member can provide an antireflection effect.

The light transmission control layer contains a resin having a hydroxyl value of 5 mgKOH/g or less. The resin having a hydroxyl value of 5 mgKOH/g or less can improve light resistance reliability of the optical member even in terms of both reflectivity and light transmittance. Reflectivity and light transmittance are main factors of the optical member according to the present invention in determination of screen quality of an optical display device, as in the optical member attached to an adherend including quantum dots and light scattering particles (e.g.: TiO$_2$). The optical member according to the present invention includes the resin having a hydroxyl value of 5 mgKOH/g or less, thereby improving light resistance reliability. The hydroxyl value of 5 mgKOH/g or less is set to reduce variation in reflectivity and light transmittance in evaluation of light resistance reliability of a light transmittance adjustment layer containing dyes or a dye mixture described below.

In one embodiment, with regard to light resistance reliability, the optical member may have a light transmittance variation of 5% or less, specifically 0% to 5%, more specifically 0% to 3%, still more specifically 0% to 1.5%, as calculated by the following Equation 1. Within this range, the optical member exhibits good light resistance reliability to improve reliability of an optical display device.

$$\text{Light transmittance variation} = \text{(total sum of absolute values of light transmittance variations)/(number of dyes contained in light transmission control layer),} \quad \text{[Equation 1]}$$

where the total sum of absolute values of light transmittance variations refers to the total sum of values represented by Equation 1-1 at the maximum absorption wavelengths of the dyes contained in the light transmission control layer:

$$|T1-T0|, \quad \text{[Equation 1-1]}$$

where T0 is initial light transmittance (unit: %) of the optical member at the maximum absorption wavelength of a dye, and T1 is light transmittance (unit: %) of the optical member at the maximum absorption wavelength of the dye after evaluation of light resistance reliability.

In one embodiment, with regard to light resistance reliability, the optical member may have a reflectivity variation of 1% or less, specifically 0% to 1%, more specifically 0% to 0.05%, as calculated by the following Equation 2. Within this range, the optical member exhibits good light resistance reliability to improve reliability of an optical display device.

$$\text{Reflectivity variation} = |R1-R0|, \quad \text{[Equation 2]}$$

where R0 is initial reflectivity (unit: %) of the optical member, and

R1 is reflectivity (unit: %) of the optical member after evaluation of light resistance reliability.

The optical member contains dyes or a dye mixture including at least one selected from among a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm. Preferably, the optical member essentially contains the first dye. With the dyes having the maximum absorption wavelength, the optical member can improve black visibility and color reproduction by further reducing reflectivity with respect to external light through complete absorption of light scattering due to the external light when stacked on an adherend including light scattering particles. In addition, the optical member containing the dyes can further reduce reflectivity, as compared with the laminate including the base film alone.

Laminate Including Base Film

Next, one embodiment of the laminate including the base film will be described.

The laminate including the base film has a reflectivity of about 5% or less, for example, greater than about 0% to about 3%, specifically greater than about 0% to about 0.5%, more specifically greater than about 0% to about 0.3%. Within this range, the laminate can improve visual sensitivity of reflection of the optical member while achieving the light transmittance range of the present invention when stacked on the light transmission control layer according to the present invention.

In one embodiment, the laminate including the base film may be an antireflection film having the above reflectivity.

The laminate including the base film may include the base film and an antireflection layer stacked on an upper surface of the base film.

The base film may include an optically transparent film. For example, the base film may have a light transmittance of about 95% or more, specifically about 95% to about 100%, at a wavelength of 380 nm to 780 nm.

The base film may include a film formed of at least one selected from among a cellulose ester resin including triacetylcellulose and the like, a polyester resin including polyethylene terephthalate (PET) and the like, a polycarbonate resin, an acrylic resin, and a cyclic olefin polymer resin. Preferably, the base film is a triacetylcellulose film or a polyethylene terephthalate film.

The base film may have a thickness of about 10 μm to about 500 μm, for example, about 50 μm to about 300 μm, specifically about 50 μm to about 150 μm. Within this range, the base film can support the light transmission control layer and an antireflection layer.

The base film may be a non-stretched film or may be a retardation film providing a certain range of phase retardation and formed by uniaxial or biaxial stretching of the non-stretched film. For example, the base film may have an in-plane retardation Re of 0 nm to 15,000 nm, preferably 0 nm to 10 nm, which indicates a non-retardation film, at a wavelength of 550 nm. The in-plane retardation Re is a value calculated by (nx−ny)×d, where nx and ny are the indexes of refraction of the base film at a wavelength of 550 nm in the slow direction and the fast direction of the base film, respectively, and d is the thickness of the base film).

The antireflection layer may include at least one selected from among a low refractivity layer, a high refractivity layer, and a hard coating layer.

The antireflection layer may be composed of a low refractivity layer alone or may include a low refractivity layer.

The low refractivity layer can reduce reflectivity of the laminate due to difference in index of refraction with the base film and/or the high refractivity layer described below.

The low refractivity layer may contain a curable binder resin, a fluorine-containing monomer, and fine particles having an average particle diameter of 5 nm to 300 nm (for example, hollow silica), and may have a thickness of 0.01 μm to 0.15 μm. The low refractivity layer may have an index of refraction of 1.20 to 1.40.

A functional coating layer is further formed on one surface of the low refractivity layer, that is, on an upper surface of the low refractivity layer to provide an additional function to the optical member. The functional coating layer may include a fingerprint resistant layer, an antistatic layer, a hard coating layer, an antiglare layer, and a barrier layer, without being limited thereto.

The antireflection layer may further include the high refractivity layer.

The high refractivity layer is formed between the base film and the low refractivity layer and has an index of refraction between those of the base film and the low refractivity layer to reduce reflectivity of the laminate. The high refractivity layer is direction formed on each of the base film and the low refractivity layer.

The high refractivity layer has a thickness of 0.05 μm to 20 μm, an index of refraction of 1.45 to 2, and the same haze value as the base film, as measured in accordance with JIS-K7361. Alternatively, a difference in haze between the high refractivity layer and the base film may be 10% or less, thereby securing good transparency and good antireflection properties.

The antireflection layer may further include a hard coating layer.

The hard coating layer serves to increase hardness of the laminate, thereby preventing generation of scratches and the like even when the laminate is placed at the outermost side of the optical display device. The laminate does not necessarily include the hard coating layer. The laminate may omit the hard coating layer so long as the laminate can secure desired hardness with the high refractivity layer or the low refractivity layer.

The hard coating layer may be formed between the base film and the high refractivity layer or between the base film and the low refractivity layer.

The hard coating layer is a cured layer in which ultrafine metal oxide particles having an average particle diameter of 1 nm to 30 nm with a particle size distribution range of +5 nm or less from the average particle diameter are uniformly mixed in a cured binder. The hard coating layer may have a thickness of 1 μm to 15 μm and an index of refraction of 1.54 or more.

The laminate may have a thickness of 50 μm to 500 μm, for example, 50 μm to 300 μm, specifically 50 μm to 150 μm. Within this range, the laminate can be used in an optical display device.

Preferably, the laminate includes the base film; and the hard coating layer, the high refractivity layer and the low refractivity layer, which are sequentially formed on the base layer. With this structure, the laminate can prevent the optical member from being damaged by external impact, even when the optical member is applied to an optical display device not including an upper polarizing plate, as described below.

Light Transmission Control Layer

Next, one embodiment of the light transmission control layer will be described.

In one embodiment, the light transmission control layer is "directly stacked" on a lower surface of the base film. Here, "directly stacked" means that a certain adhesive layer, bonding layer or adhesive/bonding layer is not present between the light transmission control layer and the base film. The optical member includes the base film directly formed on the light transmission control layer, thereby achieving reduction in thickness of the optical member.

In another embodiment, a certain optical device or an optical layer or functional may be further stacked between the base film and the light transmission control layer to provide an additional function to the optical member. For example, a barrier layer may be additionally stacked between the base film and the light transmission control layer to block moisture and/or oxygen.

The light transmission control layer contains the resin having a hydroxyl value of 5 mgKOH/g or less and dyes or a mixture thereof described in detail below. The dyes or a mixture thereof described in detail below is essentially contained in the optical member. The dyes or a mixture thereof described in detail below can increase light transmittance variation and reflectivity variation of the optical member in evaluation of light resistance reliability. However, the resin having a hydroxyl value of 5 mgKOH/g or less can remarkably reduce light transmittance variation and reflectivity variation of the optical member after evaluation of light resistance reliability.

The resin having a hydroxyl value of 5 mgKOH/g or less may have a hydroxyl value of 0 mgKOH/g to 5 mgKOH/g, for example, 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 mgKOH/g, specifically 0 mgKOH/g to 4.5 mgKOH/g, more specifically 0.1 mgKOH/g to 1 mgKOH/g. Within this range, the resin having an OH value of 5 mgKOH/g or less can remarkably reduce light transmittance variation and reflectivity variation of the optical member after evaluation of light resistance reliability while securing easy preparation thereof.

In one embodiment, the resin having a hydroxyl value of 5 mgKOH/g or less may include a non-curable resin. In another embodiment, the resin having a hydroxyl value of 5 mgKOH/g or less may include a curable resin.

The hydroxyl value of 5 mgKOH/g or less may be achieved by adjusting the kind of monomer, a mole ratio of the monomers, a polymerization temperature and/or a polymerization time in preparation of the resin using monomers described below.

In one embodiment, the resin having a hydroxyl value of 5 mgKOH/g or less may include a functional group reactive to heat and/or light, for example, at least one selected from among an epoxy group, a hydroxyl group, and a carboxylic acid group. The resin having a hydroxyl value of 5 mgKOH/g or less may include a resin capable of forming a matrix of the light transmission control layer by a solvent casting method without a curing agent, an initiator (e.g.: a photoinitiator and/or a heat initiator).

In another embodiment, the resin having a hydroxyl value of 5 mgKOH/g or less may include the functional group reactive to heat and/or light, for example, at least one selected from among an epoxy group, a hydroxyl group, and a carboxylic acid group. Here, the epoxy group, the hydroxyl group, and the carboxylic acid group are present in amounts such that the resin has a hydroxyl value of 5 mgKOH/g or less.

The resin having a hydroxyl value of 5 mgKOH/g or less may have a glass transition temperature of about 40° C. to about 200° C. Within this range, the light transmission control layer can reach the glass transition temperature according to the present invention while suppressing embrittlement thereof. The resin having a hydroxyl value of 5 mgKOH/g or less may have a glass transition temperature of, for example, about 40° C., 50° C., 60° C., 70° C., 80° C., 90° C., 100° C., 110° C., 120° C., 130° C., 140° C., 150° C., 160° C., 170° C., 180° C., 190° C., or 200° C., preferably about 100° C. to about 200° C.

In one embodiment, the resin having a hydroxyl value of 5 mgKOH/g or less may include a polymer of a monomer including a (meth)acrylic monomer or a vinyl monomer or a monomer mixture, which is free from the functional group reactive to heat and/or light. The polymer may include a homopolymer or a hetero-polymer. "Homopolymer" refers to a polymer composed of the same type of monomer and "hetero-polymer" refers to a polymer composed of two or more types of monomers.

The monomer or the monomer mixture may include at least one selected from among an unsubstituted $C_1$ to $C_{10}$ alkyl group-containing (meth)acrylic ester, a cyano (—C≡N) group-containing (meth)acrylic or vinyl monomer, a unsubstituted $C_5$ to $C_{10}$ cycloalkyl group-containing (meth)acrylic ester, an unsubstituted aromatic vinyl monomer, and an unsubstituted $C_1$ to $C_{10}$ alkyl group-containing aromatic vinyl monomer.

The monomer may include at least one selected from among methyl (meth)acrylate, ethyl (meth)acrylate, n-propyl (meth)acrylate, ethylhexyl (meth)acrylate, cyclohexyl (meth)acrylate, (meth)acrylonitrile, styrene, methyl styrene, dimethyl styrene, ethyl styrene, butyl styrene, vinyl naphthalene, diphenyl ethylene, isopropenyl toluene, isopropenyl methyl benzene, and isopropenyl ethyl benzene.

The monomer may further include a hydroxyl group-containing (meth)acrylic ester. The hydroxyl group-containing (meth)acrylic ester may include a $C_1$ to $C_{10}$ alkyl group-containing (meth)acrylic ester having at least one hydroxyl group at an ester site thereof. The hydroxyl group-containing (meth)acrylic ester may be selected from typical hydroxyl group-containing (meth)acrylic esters well-known to those skilled in the art. Here, the content of the hydroxyl group-containing (meth)acrylic ester in the monomer is set to allow the resin to have a hydroxyl value of 5 mgKOH/g or less.

In one embodiment, the resin having a hydroxyl value of 5 mgKOH/g or less may include at least one selected from among poly(meth)acrylic resins including a polyalkyl (meth)acrylic based resin, such as poly(methyl methacrylate) (PMMA) and the like, polystyrene (PS) based resins, styrene-acrylonitrile (SAN) based resins, methyl (meth)acrylate-styrene-(meth)acrylonitrile based resins including a methyl methacrylate-styrene-acrylonitrile (m-SAN) resin and the like, and polyarylene based resins.

In another embodiment, the resin having a hydroxyl value of 5 mgKOH/g or less may include at least one selected from among polycarbonate (PC) based resins, polyurethane based resins including a thermosetting polyurethane (TPU) based resin and the like, and polyvinylidene fluoride based resins including a non-modified polyvinylidene fluoride (PVDF) resin and a modified polyvinylidene fluoride (modified-PVDF) resin.

In a further embodiment, the resin having a hydroxyl value of 5 mgKOH/g or less may be a resin prepared through polymerization of a mixture including the aforementioned resins and a hydroxyl group-containing (meth)acrylic ester.

Here, the content of the hydroxyl group-containing (meth) acrylic ester may be set to allow the resin to have a hydroxyl value of 5 mgKOH/g or less.

The light transmission control layer can improve efficacy of the optical member according to the present invention through adjustment of transmittance of light received from a light source. Further, the light transmission control layer further reduces reflectivity, as compared with the laminate including the base film alone, thereby further improving visual sensitivity of reflection in use of the optical member. To this end, the light transmission control layer contains dyes or a dye mixture including at least one selected from among a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm.

Preferably, the light transmission control layer essentially contains the first dye. Here, the light transmission control layer may further include at least one selected from among the second dye, the third dye, and the fourth dye. In one embodiment, the light transmission control layer may further include the second dye. In another embodiment, the light transmission control layer may further include the second dye and the third dye. In yet another embodiment, the light transmission control layer may further include the second dye, the third dye and the fourth dye.

The first dye has a maximum absorption wavelength of about 540 nm to about 630 nm and blocks light in the neon wavelength range, thereby improving visual sensitivity of reflection and color reproduction while further reducing reflectivity of the optical member according to the present invention. Preferably, the first dye has a maximum absorption wavelength of about 540 nm, 550 nm, 560 nm, 570 nm, 580 nm, 590 nm, 600 nm, 610 nm, 620 nm, or 630 nm, specifically about 580 nm to about 610 nm.

With the first dye, the optical member may have a minimum light transmittance of about 2% to about 70%, more specifically about 2% to about 40%, still more specifically about 5% to about 20%, in the wavelength region of 540 nm to 630 nm. Within this range, the optical member can reduce reflectivity while improving visual sensitivity of reflection.

In the light transmission control layer, the first dye may be present in an amount of about 0.0001 wt % to about 10 wt %, for example, 0.0001 wt %, 0.0005 wt %, 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or 10 wt %, preferably about 0.001 wt % to about 1 wt %. Within this range, the first dye can reduce reflectivity while improving visual sensitivity of reflection. More preferably, the first dye is present in an amount of about 0.001 wt % to about 0.5 wt %, still more preferably about 0.01 wt % to about 0.1 wt %, in the light transmission control layer. Within this range, the first dye can further improve light resistance reliability of the optical member.

The first dye may include at least one selected from among porphyrin based, rhodamine based, squaraine based, cyanine based, anthraquinone based, methane based, azomethine based, oxazine based, azo based, styryl based, coumarin based, rhodamine based, xanthene based, and pyromethine based dyes. For example, the first dye may include at least one selected from among porphyrin based, rhodamine based, squaraine based, and cyanine based dyes, specifically a tetraazaporphyrin based dye.

In one embodiment, the first dye may be a porphyrin based dye. In this case, the first dye can improve color reproduction, contrast ratio, and black visibility through improvement in visual sensitivity of reflection without affecting light transmittance in other wavelength ranges.

In one embodiment, the porphyrin dye may be represented by Formula 1.

[Formula 1]

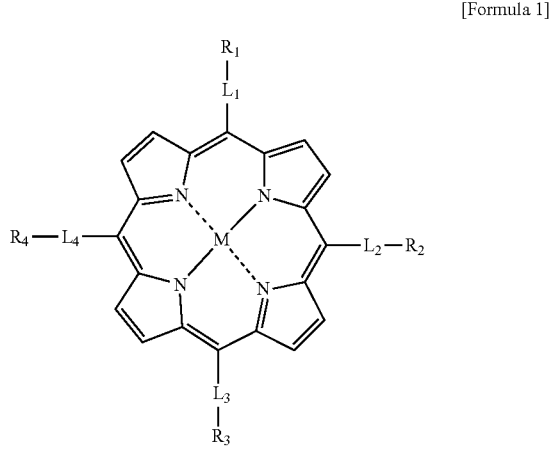

In Formula 1,

M is Zn, V, Ag, Cu, Co, Pd, In, or Ti;

$L_1$, $L_2$, $L_3$, and La are each independently a single bond or a bivalent linking group;

$R_1$, $R_2$, $R_3$, and $R_4$ are each independently hydrogen, a $C_1$ to $C_{10}$ alkyl group, a $C_3$ to $C_{10}$ cycloalkyl group, a $C_2$ to $C_{20}$ arylalkyl group, a $C_2$ to $C_{10}$ alkenyl group, a $C_3$ to $C_{10}$ cycloalkenyl group, a $C_2$ to $C_{10}$ alkynyl group, a hydroxyl group, a mercapto group, a $C_1$ to $C_{10}$ alkoxy group, a $C_1$ to $C_{10}$ alkylthio group, a $C_6$ to $C_{20}$ aryl ether group, a $C_6$ to $C_{20}$ aryl thioether group, a $C_6$ to $C_{20}$ aryl group, a $C_2$ to $C_{10}$ hetero-cycloalkyl group, a halogen, a $C_1$ to $C_{10}$ halo-alkyl group, a $C_2$ to $C_{10}$ halo-alkenyl group, a $C_2$ to $C_{10}$ halo-alkynyl group, a cyano group, a $C_2$ to $C_{10}$ aldehyde group, a carboxyl group, an amino group, a nitro group, or a $C_1$ to $C_{10}$ silyl group.

In one embodiment, the first dye may be a tetraazaporphyrin based dye. In this case, the first dye can improve color reproduction, contrast ratio, and black visibility through improvement in visual sensitivity of reflection without affecting light transmittance in other wavelength ranges. The tetraazaporphyrin based dye may be represented by Formula 2.

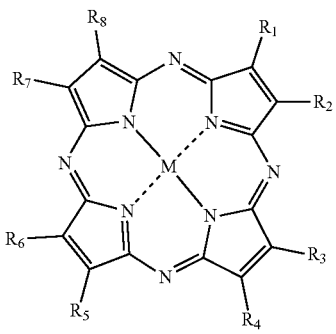

[Formula 2]

In Formula 2,

M is Zn, V, Ag, Cu, Co, Pd, In, or Ti;

$R_1$, $R_2$, $R_3$, $R_4$, $R_5$, $R_6$, $R_7$, and $R_8$ are each independently hydrogen, a $C_1$ to $C_{10}$ alkyl group, a $C_3$ to $C_{10}$ cycloalkyl group, a $C_7$ to $C_{20}$ arylalkyl group, a $C_2$ to $C_{10}$ alkenyl group, a $C_3$ to $C_{10}$ cycloalkenyl group, a $C_2$ to $C_{10}$ alkynyl group, a hydroxyl group, a mercapto group, a $C_1$ to $C_{10}$ alkoxy group, a $C_1$ to $C_{10}$ alkyl thio group, a $C_6$ to $C_{20}$ aryl ether group, a $C_6$ to $C_{20}$ aryl thioether group, a $C_6$ to $C_{20}$ aryl group, a $C_2$ to $C_{10}$ hetero-cycloalkyl group, a halogen, a $C_1$ to $C_{10}$ halo-alkyl group, a $C_2$ to $C_{10}$ halo-alkenyl group, a $C_2$ to $C_{10}$ halo-alkynyl group, a cyano group, a $C_2$ to $C_{10}$ aldehyde group, a carboxyl group, an amino group, a nitro group, or a $C_1$ to $C_{10}$ silyl group.

The first dye may be realized through adjustment of a substituent group in each of Formula 1 and Formula 2.

In the light transmission control layer, the first dye may be present in an amount of about 0.0001 parts by weight to about 10 parts by weight, for example, 0, 0.0001, 0.0005, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9 or 10 parts by weight, relative to 100 parts by weight of the resin having a hydroxyl value of 5 mgKOH/g or less. Within this range, the first dye can reduce reflectivity while improving visual sensitivity of reflection. More preferably, the first dye is present in an amount of about 0.001 parts by weight to about 0.5 parts by weight, most preferably about 0.01 parts by weight to about 0.1 parts by weight.

The second dye has a maximum absorption wavelength of about 390 nm to about 470 nm and blocks light in the violet wavelength range emitted from a blue light source, thereby improving visual sensitivity of reflection while reducing reflectivity of the optical member. Preferably, the second dye has a maximum absorption wavelength of about 390 nm, 400 nm, 410 nm, 420 nm, 430 nm, 440 nm, 450 nm, 460 nm, or 470 nm, for example, about 400 nm to about 450 nm, more preferably about 400 nm to about 445 nm.

With the second dye, the optical member may have a minimum light transmittance of about 2% to about 80%, more specifically about 2% to about 60%, still more specifically about 20% to about 60%, in the wavelength region of 390 nm to 470 nm. Within this range, the optical member can reduce reflectivity while improving visual sensitivity of reflection.

In the light transmission control layer, the second dye may be present in an amount of about 0 wt % to about 10 wt %, for example, 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or 10 wt %, preferably about 0.0001 wt % to about 1 wt %. Within this range, the second dye can reduce reflectivity while improving visual sensitivity of reflection. More preferably, the second dye is present in an amount of 0.001 wt % to about 0.5 wt %, still more preferably about 0.01 wt % to about 0.1 wt %, in the light transmission control layer. Within this range, the second dye can further improve light resistance reliability of the optical member.

The second dye may include at least one selected from among merocyanine based, cyanine based, azo based, and porphyrin based dyes, without being limited thereto. Preferably, the second dye is a merocyanine based dye. In this case, the second dye can improve color reproduction, contrast ratio, and black visibility through improvement in visual sensitivity of reflection without affecting light transmittance in other wavelength ranges.

In the light transmission control layer, the second dye may be present in an amount of about 0 parts by weight to about 10 parts by weight, for example, 0, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight, specifically about 0.0001 to about 1 part by weight, relative to 100 parts by weight of the resin having a hydroxyl value of 5 mgKOH/g or less. Within this range, the second dye can reduce reflectivity while improving visual sensitivity of reflection. More preferably, the second dye is present in an amount of about 0.001 parts by weight to about 0.5 parts by weight, most preferably about 0.01 parts by weight to about 0.1 parts by weight.

The third dye has a maximum absorption wavelength of about 480 nm to about 530 nm and blocks light in the cyan wavelength range, thereby improving visual sensitivity of reflection while reducing reflectivity of the optical member. The third dye may have a maximum absorption wavelength of, for example, about 480 nm, 490 nm, 500 nm, 510 nm, 520 nm, or 530 nm, preferably, about 480 nm to about 520 nm, more preferably about 490 nm to about 510 nm. Within this range, the third dye can reduce reflectivity while improving visual sensitivity of reflection and color reproduction.

With the third dye, the optical member may have a minimum light transmittance of about 2% to about 80%, specifically about 2% to about 60%, more specifically about 20% to about 60%, in the wavelength region of about 480 nm to about 530 nm. Within this range, the optical member can reduce reflectivity while improving visual sensitivity of reflection.

In the light transmission control layer, the third dye may be present in an amount of about 0 wt % to about 10 wt %, for example, 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or 10 wt %, specifically about 0.0001 wt % to about 1 wt %. Within this range, the third dye can reduce reflectivity while improving visual sensitivity of reflection. More preferably, the third dye is present in an amount of about 0.001 wt % to about 0.5 wt %, more preferably about 0.01 wt % to about 0.1 wt %, in the light transmission control layer. Within this range, the third dye can further improve light resistance reliability of the optical member.

The third dye may include at least one selected from among pyrromethene based, cyan based, rhodamine based, boron dipyrromethene (BODIPY) based, hydroxybenzotriazole based, benzotriazole based, and triazine based dyes. For example, the third dye may include at least one selected from among pyrromethene based dyes including a boron dipyrromethene based dye, cyan dyes, and rhodamine based dyes, specifically a boron dipyrromethene based dye.

In one embodiment, the third dye may be a pyrromethene based dye. In this case, the third dye can improve color reproduction, contrast ratio, and black visibility through improvement in visual sensitivity of reflection without affecting light transmittance in other wavelength ranges.

In one embodiment, the pyrromethene based dye may include a dye represented by Formula 3.

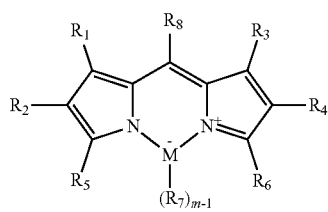

[Formula 3]

In Formula 3, $R_1$, $R_2$, $R_3$, $R_4$, $R_5$, $R_6$, $R_7$, and $R_8$ are each independently hydrogen, a $C_1$ to $C_{10}$ alkyl group, a $C_3$ to $C_{10}$ cycloalkyl group, a $C_7$ to $C_{20}$ arylalkyl group, a $C_2$ to $C_{10}$ alkenyl group, a $C_3$ to $C_{10}$ cycloalkenyl group, a $C_2$ to $C_{10}$ alkynyl group, a hydroxyl group, a mercapto group, a $C_1$ to $C_{10}$ alkoxy group, a $C_1$ to $C_{10}$ alkylthio group, a $C_6$ to $C_{20}$ aryl ether group, a $C_6$ to $C_{20}$ aryl thioether group, a $C_6$ to $C_{20}$ aryl group, a $C_2$ to $C_{10}$ hetero-cycloalkyl group, a halogen, a $C_1$ to $C_{10}$ halo-alkyl group, a $C_2$ to $C_{10}$ halo-alkenyl group, a $C_2$ to $C_{10}$ halo-alkynyl group, a cyano group, a $C_2$ to $C_{10}$ aldehyde group, a carboxyl group, an amino group, a nitro group, or a $C_1$ to $C_{10}$ silyl group; and M indicates an m-valent element, in which m is an integer of 2 to 6.

In Formula 3, $R_7$ is a halogen, preferably fluorine (F).

In Formula 3, $R_1$, $R_2$, $R_3$, $R_4$, $R_5$, $R_6$, $R_7$, and $R_8$ may be each substituted with a $C_1$ to $C_6$ alkyl group, a hydroxyl group, an amino group, a $C_6$ to $C_{20}$ aryl group, a halogen, a nitro group, and a thiol group.

In Formula 3, M is a bivalent to hexavalent element and may include at least one selected from among boron (B), beryllium (Be), magnesium (Mg), chromium (Cr), iron (Fe), nickel (Ni), copper (Cu), zinc (Zn), and platinum (Pt).

In one embodiment, the third dye may be represented by Formula 3-1.

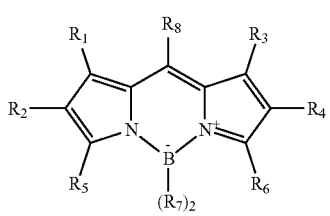

[Formula 3-1]

In Formula 3-1, $R_1$, $R_2$, $R_3$, $R_4$, $R_5$, $R_6$, $R_7$, and $R_8$ are the same as defined in Formula 3.

The third dye may be realized through adjustment of a substituent group in each of Formula 3 and Formula 3-1.

In the light transmission control layer, the third dye may be present in an amount of about 0 parts by weight to about 10 parts by weight, for example, 0, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9 or 10 parts by weight, specifically about 0.0001 to about 1 part by weight, relative to 100 parts by weight of the resin having a hydroxyl value of 5 mgKOH/g or less. Within this range, the third dye can reduce reflectivity while improving visual sensitivity of reflection. More preferably, the third dye is present in an amount of about 0.001 parts by weight to about 0.5 parts by weight, still more preferably about 0.01 parts by weight to about 0.1 parts by weight.

The fourth dye has a maximum absorption wavelength of about 640 nm to about 760 nm and absorbs light in the magenta wavelength range, thereby improving visual sensitivity of reflection and color reproduction. Preferably, the fourth dye has a maximum absorption wavelength of about 640 nm, 650 nm, 660 nm, 670 nm, 680 nm, 690 nm, 700 nm, 710 nm, 720 nm, 730 nm, 740 nm, 750 nm, or 760 nm, specifically about 640 nm to about 700 nm. Within this range, the fourth dye can improve visual sensitivity of reflection and color reproduction.

With the fourth dye, the optical member may have a minimum light transmittance of about 2% to about 80%, more specifically about 50% to about 70%, in the wavelength region of about 640 nm to about 760 nm. Within this range, the optical member can reduce reflectivity while improving visual sensitivity of reflection.

In the light transmission control layer, the fourth dye may be present in an amount of about 0 wt % to about 10 wt %, for example, 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 2 wt %, 3 wt %, 4 wt %, 5 wt %, 6 wt %, 7 wt %, 8 wt %, 9 wt %, or 10 wt %, specifically about 0.0001 wt % to about 3 wt %, preferably about 0.001 wt % to about 1 wt %. Within this range, the fourth dye can reduce reflectivity while improving visual sensitivity of reflection. More preferably, the fourth dye is present in an amount of about 0.001 wt % to about 0.5 wt %, still more preferably about 0.1 wt % to about 0.5 wt %, in the light transmission control layer. Within this range, the fourth dye can further improve light resistance reliability of the optical member.

The fourth dye may include at least one selected from among phthalocyanine based and squaraine based dyes.

In one embodiment, the fourth dye may be a phthalocyanine based dye. In this case, the fourth dye can improve color reproduction, contrast ratio, and black visibility through improvement in visual sensitivity of reflection without affecting light transmittance in other wavelength ranges.

In one embodiment, the phthalocyanine based dye may be represented by Formula 4.

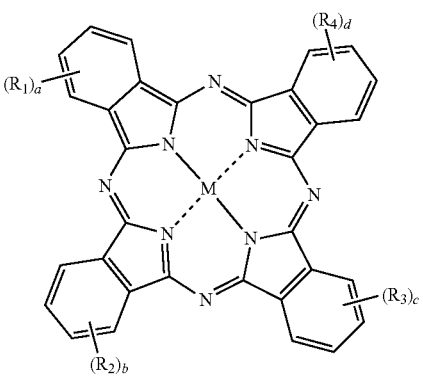

[Formula 4]

In Formula 4, $R_1$, $R_2$, $R_3$, and $R_4$ are each independently a $C_1$ to $C_{10}$ alkyl group, a $C_3$ to $C_{10}$ cycloalkyl group, a $C_7$ to $C_{20}$ arylalkyl group, a $C_2$ to $C_{10}$ alkenyl group, a $C_3$ to $C_{10}$ cycloalkenyl group, a $C_2$ to $C_{10}$ alkynyl group, a hydroxyl group, a mercapto group, a $C_1$ to $C_{10}$ alkoxy group, a $C_1$ to $C_{10}$ alkyl thio group, a $C_6$ to $C_{20}$ aryl ether group, a $C_6$ to $C_{20}$ aryl thioether group, a $C_6$ to $C_{20}$ aryl group, a $C_2$ to $C_{10}$ hetero-cycloalkyl group, a halogen, a $C_1$ to $C_{10}$ halo-alkyl group, a $C_2$ to $C_{10}$ halo-alkenyl group, a $C_2$ to $C_{10}$ halo-alkynyl group, a cyano group, a $C_2$ to $C_{10}$ aldehyde group, a carboxyl group, an amino group, a nitro group, or a $C_1$ to $C_{10}$ silyl group;

M is Pd, Cu, Ru, Pt, Ni, Co, Rh, Zn, VO, TiO, $Si(Y)_2$, $Sn(Y)_2$, or $Ge(Y)_2$ (Y being a halogen, a $C_1$ to $C_{10}$ alkoxy group, a $C_6$ to $C_{20}$ aryl oxy group, a hydroxyl group, a $C_2$ to $C_{10}$ acryl oxy group, a $C_1$ to $C_{10}$ alkyl group, a $C_6$ to $C_{20}$ aryl group, a $C_1$ to $C_{10}$ alkylthio group, or a $C_6$ to $C_{20}$ aryl thio group); and a, b, c, and d are each independently an integer of 0 to 4.

The fourth dye may be realized through adjustment of a substituent group in Formula 4.

In the light transmission control layer, the fourth dye may be present in an amount of about 0 parts by weight to about 10 parts by weight, for example, 0, 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, or 10 parts by weight, specifically about 0.0001 to about 1 part by weight, relative to 100 parts by weight of the resin having a hydroxyl value of 5 mgKOH/g or less. Within this range, the fourth dye can reduce reflectivity while improving visual sensitivity of reflection. More preferably, the fourth dye is present in an amount of about 0.001 parts by weight to about 0.5 parts by weight, more preferably about 0.01 parts by weight to about 0.5 parts by weight.

In the light transmission control layer, the dyes or the dye mixture may be present in an amount of about 0.001 parts by weight to about 40 parts by weight, for example, 0.001, 0.005, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19 or 20 parts by weight, specifically about 0.001 parts by weight to about 20 parts by weight, about 0.001 parts by weight to about 10 parts by weight, or about 0.01 parts by weight to about 1 part by weight, relative to 100 parts by weight of the resin having a hydroxyl value of 5 mgKOH/g or less. Within this range, the dyes or the dye mixture can reduce reflectivity while improving visual sensitivity of reflection.

The light transmission control layer may include at least one selected from among a thermosetting resin and a photo-curable resin each having at least one functional group reactive to heat and/or light (e.g.: an epoxy group, a hydroxyl group or a carboxylic acid group). Here, at least one selected from among the thermosetting resin and the photo-curable resin is present in an amount of about 10 wt % or less in the resin having a hydroxyl value of 5 mgKOH/g or less. Within this range, the optical member can prevent increase in light transmittance variation and reflectivity variation after evaluation of light resistance reliability.

The light transmission control layer may further include typical additives, such as a light stabilizer, an antioxidant, a plasticizer, an antistatic agent, a reworking agent, and the like. Preferably, the light transmission control layer further includes a light stabilizer to further improve light resistance reliability.

The light stabilizer may include a typical light stabilizer, such as a hindered amine light stabilizer (HALS), a phenol light stabilizer, and an oxanilide light stabilizer, which are well-known to those skilled in the art.

The additives may be present in an amount of about 0 parts by weight to about 20 parts by weight, specifically about 0.001 parts by weight to about 20 parts by weight, more specifically about 0.01 parts by weight to about 20 parts by weight, relative to 100 parts by weight of the resin having a hydroxyl value of 5 mgKOH/g or less. Within this range, the additives can provide inherent effects thereof without affecting properties of the light transmission control layer.

A composition for the light transmission control layer may be a solvent-free type. Alternatively, the composition for the light transmission control layer may further include a solvent. The composition for the light transmission control layer including a solvent can form a thin light transmission control layer while improving coatability. The solvent may be a typical solvent well-known to those skilled in the art. For example, the solvent may include at least one selected from among methyl ethyl ketone, ethyl acetate, and toluene.

In one embodiment, the light transmission control layer may be a non-adhesive layer. In this case, the light transmission control layer may be formed by depositing the composition for the light transmission control layer to a predetermined thickness on the base film, followed by drying the solvent. Solvent drying may be performed by a typical method well-known to those skilled in the art.

The light transmission control layer may have a thickness of about 0.5 μm to about 10 μm, for example, about 1 μm to about 5 μm. Within this range, the light transmission control layer can be used in the optical member.

The optical member may further include an adhesive layer on a lower surface thereof, that is, on a lower surface of the light transmission control layer. The adhesive layer may adhesively attach the optical member to a panel. The adhesive layer may be formed of a typical adhesive resin well-known to those skilled in the art. For example, the adhesive layer may be formed of a composition containing a (meth) acrylic resin.

The optical member may further include a quantum dot layer and a light scattering particle-containing layer or a panel containing quantum dots and light scattering particles on the lower surface of the optical member.

Next, an optical display device according to one embodiment of the present invention will be described. The optical display device includes the optical member according to the present invention.

In one embodiment, the optical display device includes a quantum dot layer and a light scattering particle-containing layer, and the optical member according to the present invention is disposed on one surface of the quantum dot layer or the light scattering particle-containing layer.

In another embodiment, the optical display device includes a panel containing quantum dots and light scattering particles, and the optical member according to the present invention is disposed on one surface of the panel.

In one embodiment, the optical display device may include a non-patterned quantum dot layer or a patterned quantum dot layer as the quantum dot layer.

Quantum dots are particles mainly composed of nanoscale semiconductor particles. Fluorescence of the quantum dots refers to light generated from excited electrons descending from the conduction band to the valence band. The quantum dots may include certain semiconductors including Group II-VI, Group III-V, Group IV-VI, Group IV semiconductors, and mixtures thereof. For example, the semiconductors may include any one selected from among Si, Ge, Sn, Se, Te, B, C, P, BN, BP, BAS, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdxSeySz, CdTe, HgS, HgSe, HgTe, Bes, BeSe, BeTe, MgS, MgSe, GeS, GeSe, GeTe, SnS, SnSe, SnTe, PbO, PbS, PbSe, PbTe, CuF, CuCl, CuInS$_2$, CuZnS$_3$, CuBr, CuI, Si$_3$N$_4$, Ge$_3$N$_4$, Al$_2$O$_3$, (Al, Ga, In)$_2$, (S, Se, Te)$_3$, CIGS, CGS, (ZnS)$_y$(Cu$_x$Sn$_{1-x}$S$_2$)$_{1-y}$, or a semiconductor mixture thereof. The quantum dots may have a core-shell structure or an alloy structure. Examples of the quantum dots having a core-shell structure or an alloy structure may include CdSe/ZnS, CdSe/ZnSe/ZnS, CdSe/CdS$_x$(Zn$_{1-y}$Cdy)S/ZnS, CdSe/CdS/ZnCdS/ZnS, InP/ZnS, InP/Ga/ZnS, InP/ZnSe/ZnS, PbSe/PbS, CdSe/CdS, CdSe/CdS/ZnS, CdTe/CdS, CdTe/ZnS, CuInS$_2$/ZnS, CuZnS$_3$/ZnS, and the like.

The non-patterned quantum dot layer may be a layer or film in which a certain resin is impregnated with the quantum dots. The resin may include at least one resin selected from among polystyrene, expandable polystyrene, polyvinyl chloride, styrene acrylonitrile copolymer, polyurethane, polyacrylamide, polyamide, polyvinyl butyral, polyvinyl acetate, acryl, epoxy, silicone, and unsaturated polyester resins, without being limited thereto.

The patterned quantum dot layer may include a quantum dot layer having a predetermined pattern thereon. For example, the patterned quantum dot layer may be formed by forming the quantum dot layer on a certain matrix and forming a photo-sensitive photoresist layer on the quantum dot layer, followed by masking, UV irradiation, development, and etching.

The layer or panel may generate red light and green light by scattering internal light, particularly blue light. The light scattering particle-containing layer may include TiO$_2$ particles as the light scattering particles, without being limited thereto.

The optical display device may include a substrate on one or both surfaces of the quantum dot layer or the scattering particle-containing layer or panel, and the optical member according to the present invention may be disposed on a light exit surface of the substrate. In one embodiment, the adhesive layer, the light transmission control layer, and the base film may be sequentially stacked on the light exit surface of the substrate.

In one embodiment, the quantum dot layer or the scattering particle-containing layer or panel may be free from liquid crystals.

In one embodiment, the optical display device may not include a polarizer or a polarizing plate one surface or both surfaces of the layer or the panel.

In another embodiment, the optical display device may further include at least one selected from among a polarizer, a protective film, and a functional coating layer in addition to the quantum dot layer and the substrate. Each of the polarizer, the protective film, and the functional coating layer may be stacked singularly or in plural.

The polarizer emits light through polarization of incident light in one direction. The polarizer may include a typical polarizer well-known to those skilled in the art. For example, the polarizer may include a polarizer prepared by dyeing a polyvinyl alcohol film with dichroic dyes, such as iodine and the like, and/or a polyene-based polarizer prepared through dehydration of a polyvinyl alcohol film. The protective film may be further stacked on one or both surfaces of the polarizer.

The protective film may be formed on one or both surfaces of the quantum dot layer, the polarizer, or the like to protect the quantum dot layer, the polarizer, and the like. The protective film may be substantially the same as the base film described above.

MODE FOR INVENTION

Next, the present invention will be described in more detail with reference to some examples. However, it should be noted that these examples are provided for illustration only and are not to be construed in any way as limiting the present invention.

Example 1

A composition for a light transmission control layer was prepared by mixing 20 parts by weight of a styrene acrylonitrile resin (a hydroxyl value: 0.4 mgKOH/g) (SAN, Lotte Chemical Co., Ltd.), 0.012 parts by weight of KIS001 (tetraazaporphyrin based dye, maximum absorption wavelength: 594 nm, Kyungin Synthetic Co., Ltd.) (0.06 parts by weight of the dye relative to 100 parts by weight of SAN resin), 27 parts by weight of methyl ethyl ketone, and 54 parts by weight of toluene as solvents.

An optical member was prepared by directly coating the prepared composition on a lower surface of a PET film provided as a base film of an antireflection film (including a hard coating layer, a high refractivity layer, and a low refractivity layer sequentially stacked on an upper surface of the PET film provided as the base film, reflectivity: 0.2%, DNP) using a bar coater, followed by drying the composition at 120° C. for 2 minutes to form the light transmission control layer (thickness: 5 μm) on the lower surface of the PET film.

Example 2

An optical member was prepared in the same manner as in Example 1 except that 20 parts by weight of poly(methyl methacrylate) (PMMA) (a hydroxyl value: 0.8 mgKOH/g) was used instead of 20 parts by weight of the SAN resin.

Example 3

An optical member was prepared in the same manner as in Example 1 except that 3 parts by weight of a photostabilizer (Tinuvin 292, BASF) was further added to 20 parts by weight of the SAN resin.

Example 4

An optical member was prepared in the same manner as in Example 1 except that 20 parts by weight of m-SAN (methyl methacrylate-styrene-acrylonitrile) (a hydroxyl value: 0.6 mgKOH/g) was used instead of 20 parts by weight of the SAN resin.

Example 5

An optical member was prepared in the same manner as in Example 1 except that a dye mixture of 0.012 parts by weight of KIS001 and 0.014 parts by weight of FDB-003 (merocyanine based dye, maximum absorption wavelength: 438 nm, Yamada Chemical Co.) (0.13 parts by weight of the dye mixture relative to 100 parts by weight of the SAN resin) was used instead of 0.012 parts by weight of KIS001.

Example 6

An optical member was prepared in the same manner as in Example 1 except that a dye mixture of 0.012 parts by weight of KIS001, 0.014 parts by weight of FDB-003, and 0.012 parts by weight of VD500 (boron dipyrromethene based dye, maximum absorption wavelength: 509 nm, Wooksung Chemical Co., Ltd.) (0.19 parts by weight of the dye mixture relative to 100 parts by weight of the SAN resin) was used instead of 0.012 parts by weight of KIS001.

Example 7

An optical member was prepared in the same manner as in Example 1 except that a dye mixture of 0.012 parts by weight of KIS001, 0.014 parts by weight of FDB-003, 0.012 parts by weight of VD500, and 0.06 parts by weight of IN88 (phthalocyanine based dye, maximum absorption wavelength: 675 nm, Wooksung Chemical Co., Ltd.) (0.49 parts by weight of the dye mixture relative to 100 parts by weight of the SAN resin) was used instead of 0.012 parts by weight of KIS001.

Example 8

An optical member was prepared in the same manner as in Example 1 except that a composition for the light transmission control layer was prepared using a resin (OH value: 4.5 mgKOH/g) prepared through polymerization of a mixture of 20 parts by weight of the SAN resin and 0.6 parts by weight of 4-hydroxybutyl acrylate (4-HBA) instead of 20 parts by weight of the SAN resin and was deposited onto the lower surface of the PET film provided as the base film in the antireflection film used in Example 1.

Comparative Example 1

An optical member was prepared in the same manner as in Example 1 except that a composition for the light transmission control layer was prepared using a resin (hydroxyl value: 8 mgKOH/g) prepared through polymerization of a mixture of 20 parts by weight of the SAN resin and 1 part by weight of 4-hydroxybutyl acrylate instead of 20 parts by weight of the SAN resin and was deposited onto the lower surface of the PET film provided as the base film in the antireflection film used in Example 1, followed by photo-curing the composition.

Details of the compositions for the light transmission control layer prepared in Examples and Comparative Examples are shown in Table 1. In Table 1, "-" means that a corresponding component is not present.

The optical members of Examples and Comparative Examples were evaluated as to properties of Table 1.

(1) Light transmittance variation of Equation 1 (unit: %): With respect to each of the optical members prepared in Examples and Comparative Examples, absolute values of light transmittance variations were measured at the maximum absorption wavelengths of the dyes in the light transmission control layer of the optical member before and after irradiation for 500 hours using a Xenon Test Chamber (Q-SUN) under predetermined conditions [light source lamp: Xenon lamp, irradiation wavelength: 340 nm, irradiation intensity: 0.35 W/cm$^2$, irradiation temperature: 63° C., irradiation time: 500 hours, irradiation direction: at a side of the laminate including the base film]. Light transmittance variation of Equation 1 was calculated by Equation 1: (total sum of absolute values of light transmittance variations)/(number of dyes included in light transmission control layer).

(2) Reflectivity variation of Equation 2 (unit: %): A specimen was prepared by attaching each of the optical members prepared in Examples and Comparative Examples to a black sheet (Hyundai Sheet Co., Ltd.) using a laminator at 50° C. Scattering reflectivity of the specimen was measured in a reflection mode and an SCE mode at a wavelength of 380 nm to 780 nm using a UV/VIS spectrometer Lambda 1050 (Perkin Elmer) and an average of measurements was recorded as reflectivity.

The optical member was irradiated under the same conditions as in (1) for 500 hours. Next, reflectivity was measured using the above method. Reflectivity variation of Equation 2 was calculated from absolute values of reflectivity variations before and after irradiation for 500 hours.

(3) Light transmittance (unit: %): With respect to each of the optical members prepared in Examples and Comparative Examples, light transmittance was measured using a UV-spectrophotometer (V-650, JASCO) by scanning at a wavelength of 380 nm to 800 nm.

TABLE 1

| | Example | | | | | | | | Comparative Example |
|---|---|---|---|---|---|---|---|---|---|
| | 1 | 2 | 3 | 4 | 5 | 6 | 7 | 8 | 1 |
| SAN | 20 | — | 20 | — | 20 | 20 | 20 | 20 | 20 |
| PMMA | — | 20 | — | — | — | — | — | — | — |
| m-SAN | — | — | — | 20 | — | — | — | — | — |
| 4-HBA | — | — | — | — | — | — | — | 0.6 | 1 |
| KIS001 | 0.012 | 0.012 | 0.012 | 0.012 | 0.012 | 0.012 | 0.012 | 0.012 | 0.012 |
| FDB-003 | — | — | — | — | 0.014 | 0.014 | 0.014 | — | — |
| VD500 | — | — | — | — | — | 0.012 | 0.012 | — | — |
| IN88 | — | — | — | — | — | — | 0.06 | — | — |
| Tinuvin 292 | — | — | 3 | — | — | — | — | — | — |
| Light transmittance variation (%, @ maximum absorption wavelength) | 0.2 | 1.0 | 0.1 | 0.2 | 1.0 | 1.2 | 1.4 | 4.5 | 17.2 |
| Reflectivity variation (%, @380 nm to 780 nm) | 0.01 | 0.01 | 0.01 | 0.01 | 0.01 | 0.01 | 0.01 | 0.03 | 0.1 |
| Light transmittance | 88.4 | 91.4 | 88.1 | 90.6 | 87.8 | 87.2 | 86.4 | 90.4 | 90.7 |

As shown in Table 1, the optical members according to the present invention achieved remarkable reduction in both light transmittance variation and reflectivity variation after evaluation of light resistance reliability.

Conversely, the optical member of Comparative Example 1, which includes the light transmission control layer containing a resin having a hydroxyl value greater than 5 mgKOH/g, exhibited high values in both light transmittance variation and reflectivity variation after evaluation of light resistance reliability.

It should be understood that various modifications, changes, alterations, and equivalent embodiments can be made by those skilled in the art without departing from the spirit and scope of the present invention.

The invention claimed is:

1. An optical member comprising: a base film; and a light transmission control layer stacked on a lower surface of the base film,
wherein the light transmission control layer contains dyes or a dye mixture comprising at least one selected from among a first dye having a maximum absorption wavelength of about 540 nm to about 630 nm, a second dye having a maximum absorption wavelength of about 390 nm to about 470 nm, a third dye having a maximum absorption wavelength of about 480 nm to about 530 nm, and a fourth dye having a maximum absorption wavelength of about 640 nm to about 760 nm; and a resin having a hydroxyl value (OH value) of 5 mgKOH/g or less.

2. The optical member according to claim 1, wherein a laminate comprising the base film and stacked on an upper surface of the light transmission control layer has a reflectivity of about 5% or less.

3. The optical member according to claim 2, wherein the laminate comprises the base film and at least one selected from among a low refractivity layer, a high refractivity layer and a hard coating layer stacked on an upper surface of the base film.

4. The optical member according to claim 1, wherein the resin having a hydroxyl value of 5 mgKOH/g or less comprises a resin free from a functional group reactive to heat and/or light.

5. The optical member according to claim 4, wherein the resin having a hydroxyl value of 5 mgKOH/g or less comprises a resin free from at least one selected from among an epoxy group, a hydroxyl group, and a carboxylic acid group.

6. The optical member according to claim 1, wherein the resin having a hydroxyl value of 5 mgKOH/g or less comprises a polymer of a monomer mixture comprising at least one selected from among an unsubstituted C1 to C10 alkyl group-containing (meth)acrylic ester, a cyano (—C≡N) group-containing (meth)acrylic or vinyl monomer, an unsubstituted C5 to C10 cycloalkyl group-containing (meth)acrylic ester, an unsubstituted aromatic vinyl monomer, and an unsubstituted C1 to C10 alkyl group-containing aromatic vinyl monomer.

7. The optical member according to claim 1, wherein the resin having a hydroxyl value of 5 mgKOH/g or less comprises at least one selected from among a poly(meth)acrylic based resin, a polystyrene based resin, a styrene-acrylonitrile based resin, a methyl (meth)acrylate-styrene-(meth)acrylonitrile based resin, and a polyarylene based resin.

8. The optical member according to claim 1, wherein the resin having a hydroxyl value of 5 mgKOH/g or less comprises at least one selected from among a polycarbonate based resin, a polyurethane based resin, and a polyvinylidene fluoride based resin.

9. The optical member according to claim 1, wherein the light transmission control layer comprises the first dye.

10. The optical member according to claim 9, wherein the first dye comprises a porphyrin based dye.

11. The optical member according to claim 9, wherein the first dye is present in an amount of about 0.0001 parts by weight to about 10 parts by weight relative to 100 parts by weight of the resin having a hydroxyl value of 5 mgKOH/g or less.

12. The optical member according to claim 9, wherein the light transmission control layer further comprises at least one selected from among the second dye, the third dye, and the fourth dye.

13. The optical member according to claim 12, wherein the second dye is a merocyanine based dye, the third dye is a boron dipyrromethene based dye, and the fourth dye is a phthalocyanine based dye.

14. The optical member according to claim 12, wherein the light transmission control layer further comprises about 0 parts by weight to about 10 parts by weight of the second dye, about 0 parts by weight to about 10 parts by weight of the third dye, and about 0 parts by weight to about 10 parts by weight of the fourth dye, relative to 100 parts by weight of the resin having a hydroxyl value of 5 mgKOH/g or less.

15. The optical member according to claim 1, wherein the light transmission control layer further comprises a light stabilizer.

16. The optical member according to claim 1, wherein the optical member has a light transmittance variation of 5% or less, as calculated by Equation 1, and a reflectivity variation of 1% or less, as calculated by Equation 2:

Light transmittance variation=(total sum of absolute values of light transmittance variations)/(number of dyes contained in light transmission control layer), [Equation 1]

where the total sum of absolute values of light transmittance variations refers to the total sum of values represented by Equation 1-1 at the maximum absorption wavelengths of the dyes contained in the light transmission control layer:

|T1−T0| [Equation 1-1]

where T0 is initial light transmittance (unit: %) of the optical member at the maximum absorption wavelength of a dye, and
T1 is light transmittance (unit: %) of the optical member at the maximum absorption wavelength of the dye after evaluation of light resistance reliability;

Reflectivity variation=|R1−R0|, [Equation 2]

where R0 is initial reflectivity (unit: %) of the optical member, and
R1 is reflectivity (unit: %) of the optical member after evaluation of light resistance reliability.

17. An optical display device comprising the optical member according to claim 1.

18. The optical display device according to claim 17, further comprising:
a quantum dot layer and a light scattering particle-containing layer or a panel containing quantum dots and light scattering particles on a lower surface of the optical member.

* * * * *